United States Patent
Liu et al.

(10) Patent No.: US 11,995,797 B2
(45) Date of Patent: May 28, 2024

(54) SUPER RESOLUTION IMAGE GENERATING DEVICE

(71) Applicant: REALTEK SEMICONDUCTOR CORPORATION, Hsinchu (TW)

(72) Inventors: Kang-Yu Liu, Hsinchu (TW); Chia-Wei Yu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 108 days.

(21) Appl. No.: 17/972,195

(22) Filed: Oct. 24, 2022

(65) Prior Publication Data

US 2023/0153944 A1    May 18, 2023

(30) Foreign Application Priority Data

Nov. 17, 2021    (TW) ................................ 110142683

(51) Int. Cl.
*G06T 3/4046*    (2024.01)
*G06N 3/045*    (2023.01)
*G06T 3/4053*    (2024.01)

(52) U.S. Cl.
CPC ............ *G06T 3/4053* (2013.01); *G06N 3/045* (2023.01)

(58) Field of Classification Search
CPC ..... G06T 3/4046; G06T 3/4053; G06N 3/047; G06N 3/088; G06N 3/045; G06N 3/08
See application file for complete search history.

(56) References Cited

U.S. PATENT DOCUMENTS

| 2015/0348234 | A1* | 12/2015 | Peng | G06T 3/4053 |
| | | | | 382/199 |
| 2021/0224951 | A1* | 7/2021 | Ahn | G06T 3/4053 |
| 2022/0245407 | A1* | 8/2022 | Vadali | G06V 10/23 |
| 2023/0132180 | A1* | 4/2023 | Hsieh | G06T 7/155 |
| | | | | 382/299 |

(Continued)

FOREIGN PATENT DOCUMENTS

| CN | 111968064 A | 11/2020 |
| TW | 202044196 A | 12/2020 |

OTHER PUBLICATIONS

Wang et al. "Enhanced Super-Resolution Generative Adversarial Networks", Sep. 2018.

(Continued)

*Primary Examiner* — Xilin Guo
(74) *Attorney, Agent, or Firm* — WPAT, P.C

(57) ABSTRACT

A super resolution image generating device capable of processing an image flexibly includes a scaling-up circuit, a front-end circuit, a first branch circuit, a second branch circuit, and an arithmetic circuit. The scaling-up circuit scales up the image to generate an enlarged image including N pixel values. The front-end circuit extracts features of the image to generate a front-end feature map. The first branch circuit extracts features of the front-end feature map to generate a first feature map, and scales up the first feature map to generate N first values. The second branch circuit processes the front-end feature map to generate a second feature map, scales up the second feature map to generate N second values, and processes the N second values to generate N processed values. The arithmetic circuit combines the N pixel values, the N first values, and the N processed values to generate a super resolution image.

20 Claims, 9 Drawing Sheets

(56) References Cited

U.S. PATENT DOCUMENTS

2023/0139962 A1* 5/2023 Xiang .................. G06T 3/4046
                                                         382/275
2023/0140100 A1* 5/2023 Potapov ................ G06N 3/045
                                                         345/428

OTHER PUBLICATIONS

Ledig et al. "Photo-Realistic Single Image Super-Resolution Using a Generative Adversarial Networks", May 2017.
OA letter of a counterpart TW application (appl. No. 110142683) mailed on Dec. 12, 2022. Summary of the TW OA letter in regard to the TW counterpart application: (1) Claims 1, 5, and 8 are rejected as being unpatentable over reference (TW 202044196 A) in view of reference (CN 111968064 A). P.S. Correspondence between the claims of the TW counterpart application and the claims of the present US application: (1) Claims 1, 5, and 8 of the TW counterpart application are corresponding to the claims 1, 9, and 17 of the present US application respectively.

* cited by examiner

SUPER RESOLUTION IMAGE GENERATING DEVICE

BACKGROUND OF THE INVENTION

1. Field of the Invention

The present disclosure relates to an image generating device, especially to a super resolution image generating device.

2. Description of Related Art

An Artificial Intelligence Super-Resolution (AISR) technology and a Generative Adversarial Network (GAN) technology can be applied to the improvement in an image resolution. A representative implementation is Enhanced Super-Resolution Generative Adversarial Network (ESR-GAN).

An example of ESRGAN is described below:
(1) optimizing the loss between a high resolution image and an image generated by the AISR technology, and thereby generating a super-resolution weight table (hereinafter referred to as the model A) which can be used for generating a stable image with fewer artifacts or without any artifacts but cannot be used for generating image details;
(2) optimizing the model A with the GAN technology and thereby generating another super-resolution weight table (hereinafter referred to as the model B) which can be used for generating an image with details but usually brings the image artifacts; and
(3) blending the model A and the model B and thereby obtaining blended weights, and then using a super resolution generative adversarial network (SRGAN) to process an input image (i.e., a low resolution image) according to the blended weights and thereby generate an output image (i.e., a high resolution image).

However, the above-mentioned example has drawbacks as follows:
(1) the example processing the whole input image with the blended weights, which means that the example is unable to process an image block of the input image with the model A and process another image block of the input image with the model B;
(2) the example being unable to cancel the artifacts caused by the GAN technology; and
(3) the example being unable to process different image blocks of the input image discriminatively with the model B.

Prior arts are also found in the following references:
(1) ESRGAN: Enhanced Super-Resolution Generative Adversarial Networks (https://arxiv.org/pdf/1809.00219.pdf); and
(2) Photo-Realistic Single Image Super-Resolution Using a Generative Adversarial Network (haps://arxiv.org/abs/1609.04802).

SUMMARY OF THE INVENTION

An object of the present disclosure is to provide a super resolution image generating device as an improvement over the prior art.

An embodiment of the super resolution image generating device of the present disclosure includes an image scaling-up circuit, a front-end circuit, a first branch circuit, a second branch circuit, and an arithmetic circuit. The image scaling-up circuit is configured to scale up a low resolution image and thereby generate an enlarged image, wherein the enlarged image includes N pixel value(s) and the N is a positive integer. The front-end circuit is configured to extract at least one feature of the low resolution image and thereby generate a front-end feature map. The first branch circuit is configured to extract at least one feature of the front-end feature map and thereby generate a first feature map, and configured to scale up the first feature map and thereby generate N first value(s), wherein the N first value(s) is/are corresponding to the N pixel value(s). The second branch circuit is configured to process the front-end feature map and thereby generate a second feature map, and configured to scale up the second feature map and thereby generate N second value(s), and further configured to process the N second value(s) and thereby generate N processed value(s), wherein the second feature map includes image details and the N processed value(s) is/are corresponding to the N pixel value(s). The arithmetic circuit is coupled to the image scaling-up circuit, the first branch circuit, and the second branch circuit, and configured to combine the N pixel value(s), the N first value(s), and the N processed value(s) and thereby generate N output pixel value(s) of a super resolution image.

Another embodiment of the super resolution image generating device of the present disclosure includes an image scaling-up circuit, a first branch circuit, a second branch circuit, and an arithmetic circuit. The image scaling-up circuit is configured to scale up a low resolution image and thereby generate an enlarged image, wherein the enlarged image includes N pixel value(s) and the N is a positive integer. The first branch circuit is configured to extract at least one feature of the low resolution image and thereby generate a first feature map, and configured to scale up the first feature map and thereby generate N first value(s), wherein the N first value(s) is/are corresponding to the N pixel value(s). The second branch circuit is configured to process the low resolution image and thereby generate a second feature map, and configured to scale up the second feature map and thereby generate N second value(s), and further configured to process the N second value(s) and thereby generate N processed value(s), wherein the second feature map includes image details and the N processed value(s) is/are corresponding to the N pixel value(s). The arithmetic circuit is coupled to the image scaling-up circuit, the first branch circuit, and the second branch circuit, and configured to combine the N pixel value(s), the N first value(s), and the N processed value(s) and thereby generate N output pixel value(s) of a super resolution image.

An embodiment of the super resolution image generating device of the present disclosure includes a front-end circuit, a first branch circuit, a second branch circuit, and an arithmetic circuit. The front-end circuit is configured to reserve original pixel values of a low resolution image, and configured to extract at least one feature of the low resolution image and thereby generate a front-end feature map. The first branch circuit is configured to process the front-end feature map and thereby generate an enlarged image, wherein the enlarged image includes N stable pixel value(s) and the N is a positive integer. The second branch circuit is configured to process the front-end feature map and thereby generate a second feature map, and configured to scale up the second feature map and thereby generate N second value(s), and further configured to process the N second value(s) and thereby generate N processed value(s), wherein the second feature map includes image details and the N processed value(s) is/are corresponding to the N pixel value(s). The arithmetic circuit is coupled to the first branch circuit and the second branch circuit, and configured to combine the N stable pixel value(s) and the N processed value(s) and thereby generate N output pixel value(s) of a super resolution image.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a super resolution (SR) image generating device operable to process an input image flexibly and thereby generate an SR image. For example, the SR image generating device of the present disclosure can process different image blocks of an input image discriminatively and thereby generate the SR image.

Figure 1:
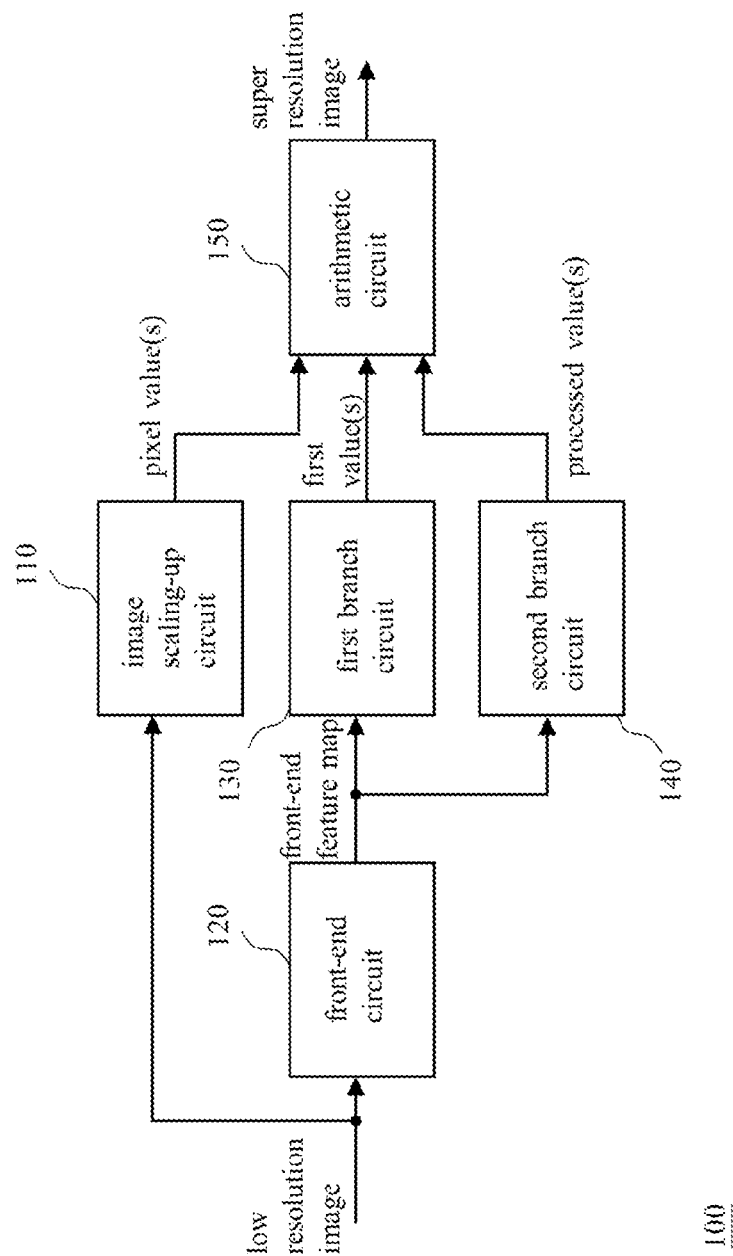
FIG. 1 shows an embodiment of the super resolution image generating device of the present disclosure.

FIG. 1 shows an embodiment of the SR image generating device of the present disclosure. This embodiment is for generating an SR image including N output pixel value(s), wherein the N is an integer being equal to a scaling-up ratio multiplied by a number of pixels of an input image (i.e., the size of the input image), and the scaling-up ratio and the number of pixels of the input image are determined according to the demand for implementation. For example, the N is an integer equal to or greater than 320×200. The SR image generating device 100 of FIG. 1 includes an image scaling-up circuit 110, a front-end circuit 120, a first branch circuit 130, a second branch circuit 140, and an arithmetic circuit 150. These circuits are described in the following paragraphs.

In regard to the embodiment of FIG. 1, the image scaling-up circuit 110 is configured to scale up a low resolution image and thereby generate an enlarged image, wherein the enlarged image includes N pixel value(s). The image scaling-up circuit 110 is realized with a known/self-developed technology such as a known image scaling circuit.

Figure 2:
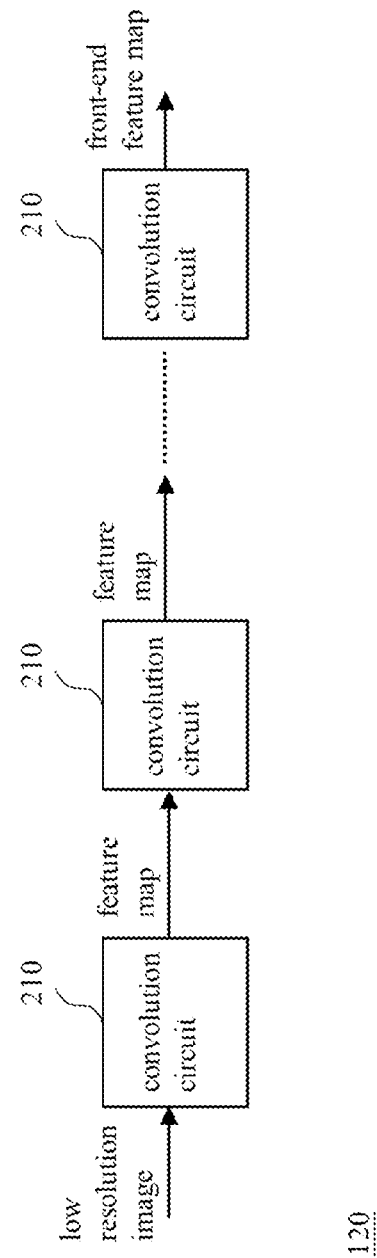
FIG. 2 shows an embodiment of the front-end circuit of FIG. 1.

In regard to the embodiment of FIG. 1, the front-end circuit 120 is configured to extract at least one feature of the low resolution image and thereby generate a front-end feature map. FIG. 2 shows an embodiment of the front-end circuit 120 including a plurality of convolution circuits 210 coupled in series. In an exemplary implementation of the embodiment of FIG. 2, each convolution circuit 210 uses a convolution kernel (e.g., a 3×3 filter matrix whose elements are determined according to the demand for implementation) to process an input image by a predetermined step (e.g., a step of one pixel) and in a predetermined order (e.g., an order from the left to the right and from the top to the bottom), and in this manner each convolution circuit 210 performs a convolution operation to the whole input image; accordingly, one convolution circuit 210 extracts at least one feature of the input image (e.g., the edge, line, corner, and so on) and thereby generates a feature map as a succeeding input image for the next convolution circuit 210. However, the present invention is not limited to the above exemplary implementation, which means that each convolution circuit 210 can be realized with other known/self-developed technologies. Since the convolution circuits 210 of FIG. 2 perform multiple convolution processes in turn, the feature map outputted by the last convolution circuit 210, that is to say the front-end feature map, shows at least one specific feature of the low resolution image. The front-end circuit 120 is realized with a known/self-developed technology such as a convolutional neural network (CNN), a residual network (Res-net), or a densely connected convolutional network (Dense-net).

Figure 3:
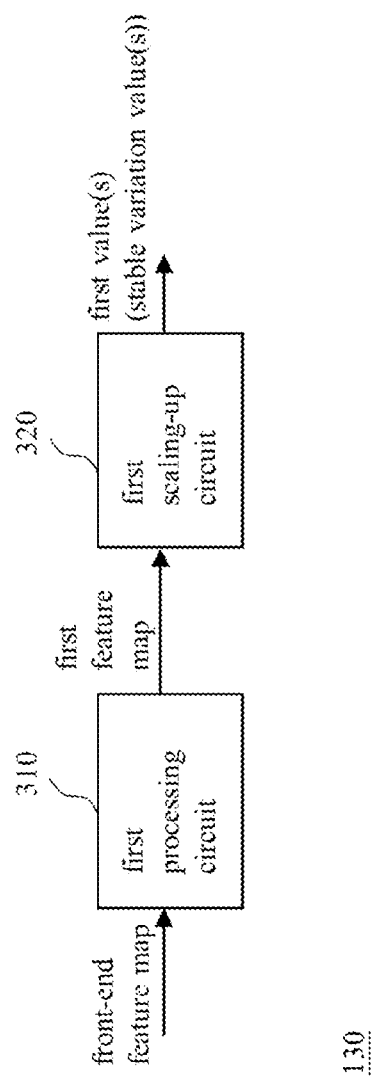
FIG. 3 shows an embodiment of the first branch circuit of FIG. 1.

In regard to the embodiment of FIG. 1, the first branch circuit 130 is configured to extract at least one feature of the front-end feature map and thereby generate a first feature map. The first branch circuit 130 is also configured to scale up the first feature map and thereby generate N first value(s), wherein the N first value(s) is/are corresponding to the N pixel value(s). FIG. 3 shows an embodiment of the first branch circuit 130 including a first processing circuit 310 and a first scaling-up circuit 320. The first processing circuit 310 is configured to extract the at least one feature of the front-end feature map (e.g., a sharpened result, a de-noised result, and so on) and thereby generate the first feature map. An embodiment of the first processing circuit 310 is illustrated with FIG. 2 and is realized with a known/self-developed technology (e.g., a convolutional neural network, a residual network, or a densely connected convolutional network). It is noted that although the embodiment of the first processing circuit 310 is similar to the embodiment of the front-end circuit 120, the operation parameters of the two circuits are usually different and are set according to their respective demands for implementation. The first scaling-up circuit 320 is configured to scale up the first feature map and thereby generate N stable variation value(s) as the N first value(s). The first scaling-up circuit 320 is realized with a known/self-developed technology such as a pixel shuffle technology.

Figure 4:
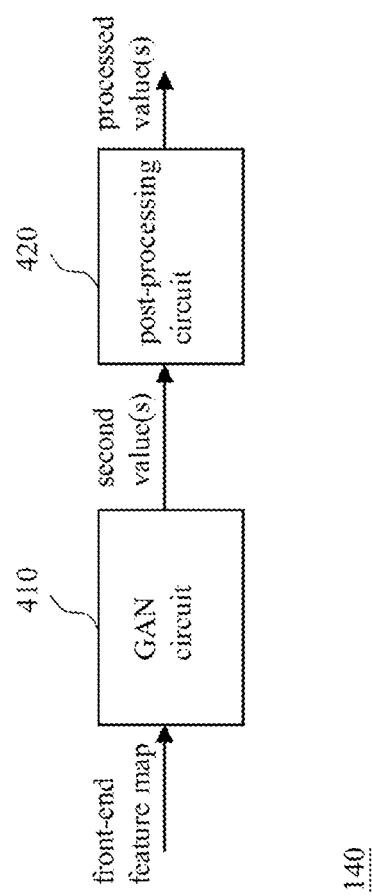
FIG. 4 shows an embodiment of the second branch circuit of FIG. 1.

In regard to the embodiment of FIG. 1, the second branch circuit 140 is configured to process the front-end feature map and thereby generate a second feature map, and configured to scale up the second feature map and thereby generate N second value(s), and further configured to process the N second value(s) and thereby generate N processed value(s), wherein the second feature map includes image details that are not included in the front-end feature map and the N processed value(s) is/are corresponding to the N pixel value(s). FIG. 4 shows an embodiment of the second branch circuit 140 including a generative adversarial network (GAN) circuit 410 and a post-processing circuit 420, wherein the GAN circuit 410 is configured to generate the N second value(s) and the post-processing circuit 420 is configured to generate the N processed value(s).

Figure 5:
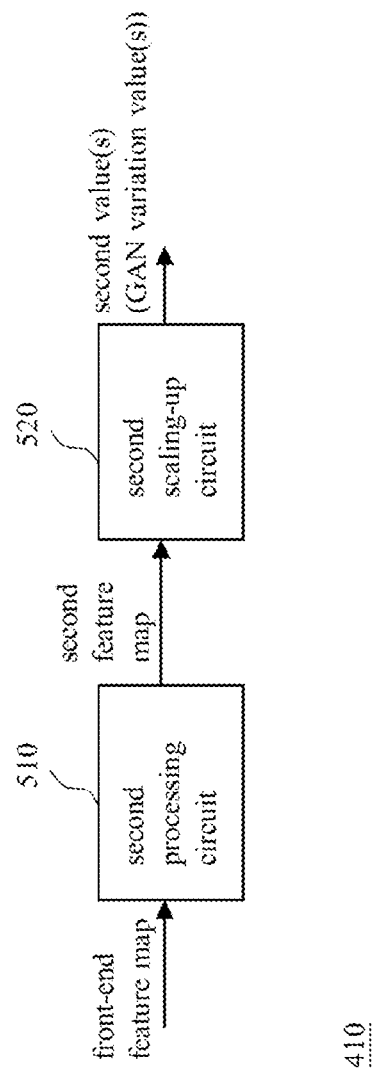
FIG. 5 shows an embodiment of the generative adversarial network (GAN) circuit of FIG. 4.

FIG. 5 shows an embodiment of the GAN circuit 410 including a second processing circuit 510 and a second scaling-up circuit 520. The second processing circuit 510 is configured to generate the second feature map according to the front-end feature map, wherein the second feature map includes the aforementioned image details. An embodiment of the second processing circuit 510 is illustrated with FIG. 2 and is realized with a known/self-developed technology (e.g., a convolutional neural network, a residual network, or a densely connected convolutional network). It is noted that although the embodiment of the second processing circuit 510 is similar to the embodiment of the front-end circuit 120, the operation parameters of the two circuits are usually different and are set according to their respective demands for implementation. The second scaling-up circuit 520 is configured to scale up the second feature map and thereby generate N GAN variation value(s) as the N second value(s). The second scaling-up circuit 520 is realized with a known/self-developed technology such as a pixel shuffle technology.

Figure 6:
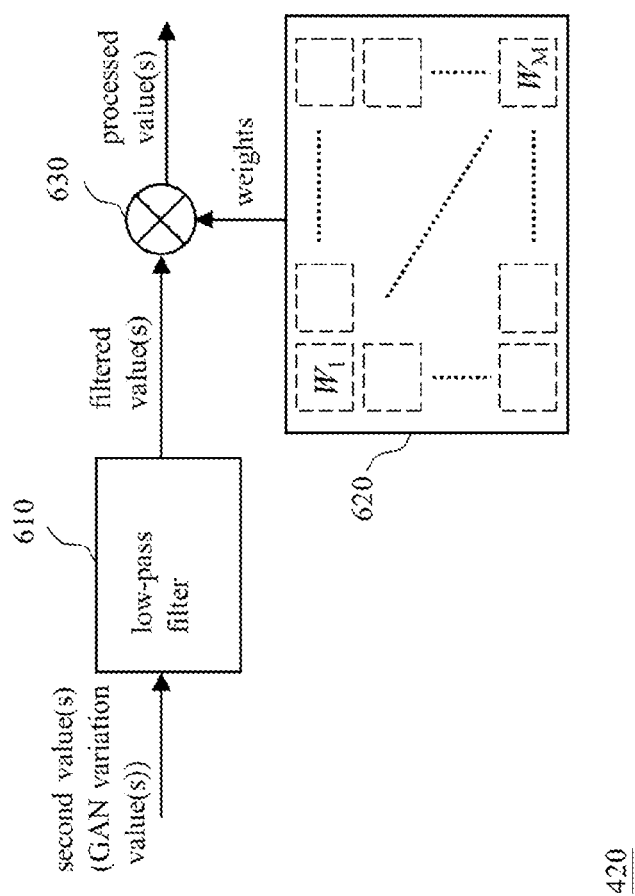
FIG. 6 shows an embodiment of the post-processing circuit of FIG. 4.

FIG. 6 shows an embodiment of the post-processing circuit 420 including a low-pass filter 610, a controlled mask 620, and a multiplier 630. In regard to the embodiment of FIG. 6, the aforementioned N is greater than one, the low-pass filter 610 is configured to generate N filtered values according to the N GAN variation values and thereby cancel the artifacts generated by the GAN circuit 410, wherein the N filtered values are corresponding to the aforementioned N pixel values of the enlarged image. The controlled mask 620 is configured to determine M weights $W_1$~$W_M$ for M image blocks of the enlarged image and thereby allow the M image blocks to be processed discriminatively, wherein the M is an integer greater than one, and the M image blocks are corresponding to M groups of pixel values of the N pixel values of the enlarged image respectively, and the M image blocks are corresponding to M groups of filtered values of the N filtered values respectively. The multiplier 630 is coupled to the controlled mask 620 and the low-pass filter 610, and configured to process the M groups of filtered values according to the M weights respectively and thereby generate the N processed values. For example, the multiplier 630 multiplies an $X^{th}$ group of filter value(s) of the M groups of filtered values by an $X^{th}$ weight of the M weights to obtain an $X^{th}$ group of processed value(s) of the N processed values, wherein the X is a positive integer.

In an exemplary implementation of the embodiment of FIG. 6, the controlled mask 620 determines the M weights $W_1$~$W_M$ according to external information, wherein the external information includes at least one of the following: semantic segmentation classification information; noise detection information; and motion strength information. In an exemplary implementation of the embodiment of FIG. 6, at least two of the M weights are different so that at least two image blocks of the enlarged image are processed discriminatively. In an exemplary implementation of the embodiment of FIG. 6, a weight $W_K$ among the M weights is zero, which implies that the image block of the enlarged image being processed with the weight $W_K$ incorporates the stable variation value(s) generated by the first branch circuit 130 but does not incorporate any image detail generated by the second branch circuit 140. In an exemplary implementation of the embodiment of FIG. 6, a weight $W_K$ among the M weights is one, which implies that the image block of the enlarged image being processed with the weight $W_K$ not only incorporates the stable variation value(s) generated by the first branch circuit 130 but also incorporates all the image details generated by the second branch circuit 140.

Figure 7:
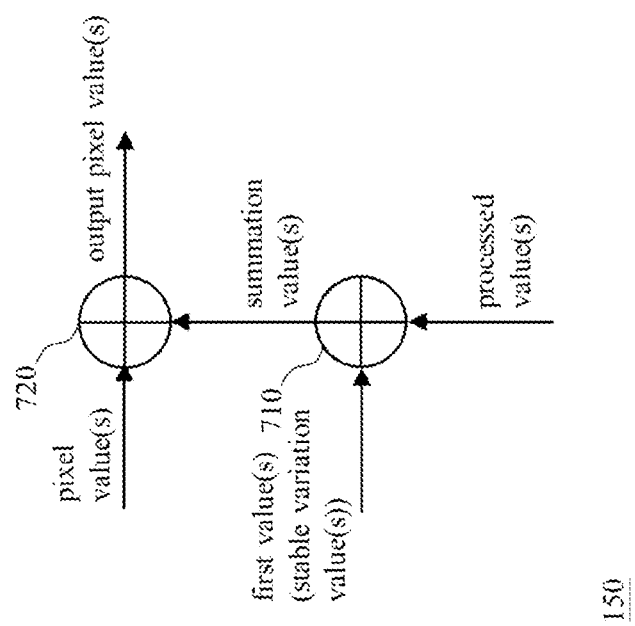
FIG. 7 shows an embodiment of the arithmetic circuit of FIG. 1.

In regard to the embodiment of FIG. 1, the arithmetic circuit 150 is coupled to the image scaling-up circuit 110, the first branch circuit 130, and the second branch circuit 140, and configured to combine the N pixel value(s), the N first value(s), and the N processed value(s) and thereby generate N output pixel value(s) of the SR image. FIG. 7 shows an embodiment of the arithmetic circuit 150 including a first summation circuit 710 and a second summation circuit 720. The first summation circuit 710 is coupled to the first scaling-up circuit 320 and the post-processing circuit 420, and configured to add up a $K^{th}$ variation value of the N stable variation value(s) and a $K^{th}$ processed value of the N processed value(s) and thereby generate a $K^{th}$ summation value corresponding to a $K^{th}$ pixel value of the N pixel value(s), wherein the K is a positive integer. The second summation circuit 720 is coupled to the image scaling-up circuit 110 and the first summation circuit 710, and configured to add up the $K^{th}$ pixel value and the $K^{th}$ summation value and thereby generate a $K^{th}$ output pixel value of the N output pixel value(s). In the above-mentioned manner, the N output pixel value(s) of the SR image is/are generated in turn.

In regard to the embodiment of FIG. 1, the first branch circuit 130 and the second branch circuit 140 receive the same front-end feature map from the front-end circuit 120, and this cuts the consumption of hardware resources. It is noted that the optimization of the operation parameters of the front-end circuit 120, the first branch circuit 130, and the second branch circuit 140 can be achieved through a training method in a circuit development phase, and this can be realized with a known/self-developed technology. Since the present invention focuses on the configuration of an SR image generating device rather than the optimization of the operation parameters of the SR image generating device, the above-mentioned training method is beyond the scope of the present disclosure.

Figure 8:
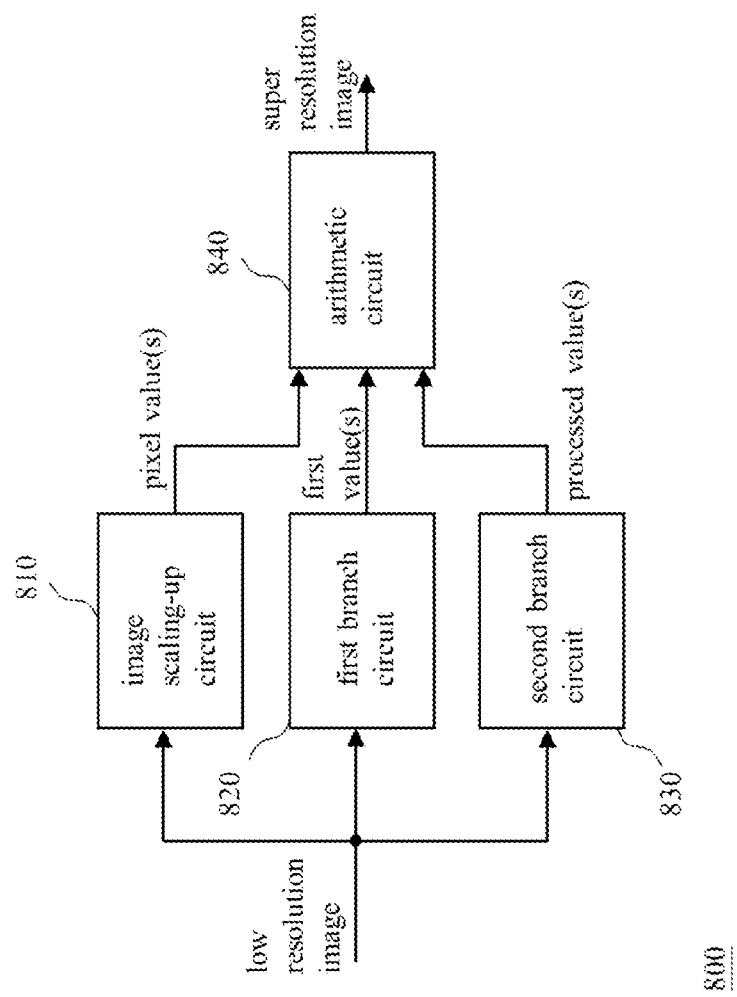
FIG. 8 shows another embodiment of the super resolution image generating device of the present disclosure.

FIG. 8 shows another embodiment of the SR image generating device of the present disclosure. The SR image generating device 800 of FIG. 8 includes an image scaling-up circuit 810, a first branch circuit 820, a second branch circuit 830, and an arithmetic circuit 840. The main difference between the embodiment of FIG. 8 and the embodiment of FIG. 1 is that: the embodiment of FIG. 8 does not include the front-end circuit 120 of FIG. 1, but integrates the front-end circuit 120 and the first branch circuit 130 of FIG. 1 into the first branch circuit 820 of FIG. 8 and integrates the front-end circuit 120 and the second branch circuit 140 of FIG. 1 into the second branch circuit 830 of FIG. 8. Therefore, the first branch circuit 820 is configured to extract at least one feature of the low resolution image instead of the aforementioned front-end feature map and thereby generate a first feature map; and the first branch circuit 820 is further configured to scale up the first feature map and thereby generate the N first value(s). The second branch circuit 830 is configured to process the low resolution image instead of the aforementioned front-end feature map and thereby generate a second feature map; the second branch circuit 830 is also configured to scale up the second feature map and thereby generate the N second value(s), and further configured to process the N second value(s) and thereby generate the N processed value(s), wherein the second feature map includes image details that are not included in the low resolution image.

Since those having ordinary skill in the art can refer to the embodiments of FIGS. 1-7 to appreciate the detail and modification of the embodiment of FIG. 8, which implies that some or all of the features of the embodiments of FIGS. 1-7 can be applied to the embodiment of FIG. 8 in a logical way, repeated and redundant description is omitted here.

Figure 9:
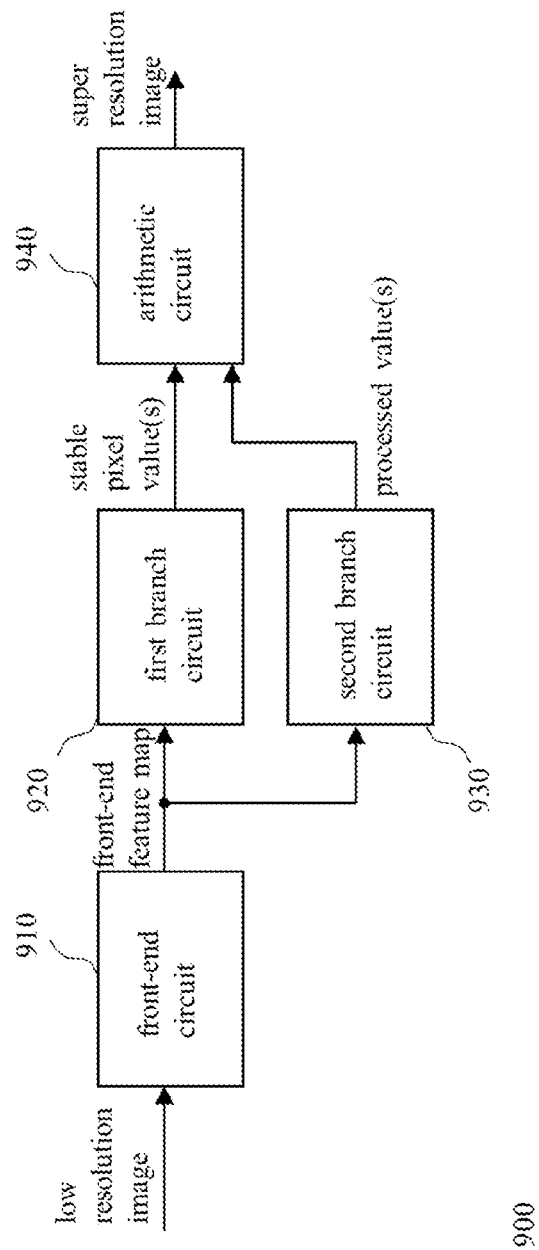
FIG. 9 shows another embodiment of the super resolution image generating device of the present disclosure.

FIG. 9 shows another embodiment of the SR image generating device of the present disclosure. The SR image generating device 900 of FIG. 9 includes a front-end circuit 910, a first branch circuit 920, a second branch circuit 930, and an arithmetic circuit 940. The main difference between the embodiment of FIG. 9 and the embodiment of FIG. 1 is that: the embodiment of FIG. 9 does not include the image scaling-up circuit 110 of FIG. 1, but makes the first branch circuit 920 receive original pixel values of a low resolution image from the front-end circuit 910, reserve the original pixel values, and scale up the low resolution image.

In regard to the embodiment of FIG. 9, the front-end circuit 910 (e.g., the front-end circuit 120 of FIG. 2) is configured to reserve the original pixel values of the low resolution image, and to extract at least one feature of the low resolution image and thereby generate a front-end feature map. The first branch circuit 920 includes a processing circuit (e.g., the first processing circuit 310 of FIG. 3) and a scaling-up circuit (e.g., the first scaling-up circuit 320 of FIG. 3). The processing circuit is configured to receive the original pixel values of the low resolution image from the front-end circuit 910 and then reserve the original pixel values, and configured to receive the front-end feature map from the front-end circuit 910 and extract at least one feature of the front-end feature map to generate a first feature map. The scaling-up circuit is configured to scale up the first feature map and thereby generate an enlarged image, wherein the enlarged image includes N stable pixel value(s) composed of N stable value(s) and N first value(s), the N stable value(s) originate(s) from the original pixel values of the low resolution image, and the N first value(s) (e.g., the aforementioned N stable variation value(s)) originate(s) from the at least one feature of the front-end feature map. The second branch circuit 930 is configured to process the front-end feature map and thereby generate a second feature map, and configured to scale up the second feature map and thereby generate N second value(s), and further configured to process the N second value(s) and thereby generate N processed value(s), wherein the second feature map includes image details that are not included in the front-end feature map. The arithmetic circuit 940 is coupled to the first branch circuit 920 and the second branch circuit 930, and configured to combine the N stable pixel value(s) and the N processed value(s) and thereby generate N output pixel value(s) of an SR image.

Since those having ordinary skill in the art can refer to the embodiments of FIGS. 1-7 to appreciate the detail and modification of the embodiment of FIG. 9, which implies that some or all of the features of the embodiments of FIGS. 1-7 can be applied to the embodiment of FIG. 9 in a logical way, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the implementation of the present invention can be flexible based on the present disclosure.

To sum up, the SR image generating device of the present disclosure can process an image flexibly according to the demand for implementation and thereby achieve better results.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A super resolution image generating device, comprising:
    an image scaling-up circuit configured to scale up a low resolution image and thereby generate an enlarged image, wherein the enlarged image includes N pixel value(s) and the N is a positive integer;
    a front-end circuit configured to extract at least one feature of the low resolution image and thereby generate a front-end feature map;
    a first branch circuit configured to extract at least one feature of the front-end feature map and thereby generate a first feature map, and configured to scale up the first feature map and thereby generate N first value(s), wherein the N first value(s) is/are corresponding to the N pixel value(s);
    a second branch circuit configured to process the front-end feature map and thereby generate a second feature map, and configured to scale up the second feature map and thereby generate N second value(s), and further configured to process the N second value(s) and thereby generate N processed value(s), wherein the second feature map includes image details and the N processed value(s) is/are corresponding to the N pixel value(s); and
    an arithmetic circuit coupled to the image scaling-up circuit, the first branch circuit, and the second branch circuit, and configured to combine the N pixel value(s), the N first value(s), and the N processed value(s) and thereby generate N output pixel value(s) of a super resolution image.

2. The super resolution image generating device of claim 1, wherein:
    the first branch circuit includes:
        a first processing circuit configured to extract the at least one feature of the front-end feature map and thereby generate the first feature map; and
        a first scaling-up circuit configured to scale up the first feature map and thereby generate N stable variation value(s) as the N first value(s);
    the second branch circuit includes:
        a generative adversarial network (GAN) circuit including:
            a second processing circuit configured to generate the second feature map according to the front-end feature map; and
            a second scaling-up circuit configured to scale up the second feature map and thereby generate N GAN variation value(s) as the N second value(s); and
        a post-processing circuit configured to process the N GAN variation value(s) and thereby generate the N processed value(s); and
    the arithmetic circuit includes:
        a first summation circuit coupled to the first scaling-up circuit and the post-processing circuit, and configured to add up a $K^{th}$ variation value of the N stable variation value(s) and a $K^{th}$ processed value of the N processed value(s) and thereby generate a $K^{th}$ summation value corresponding to a $K^{th}$ pixel value of the N pixel value(s), wherein the K is a positive integer; and
        a second summation circuit coupled to the image scaling-up circuit and the first summation circuit, and configured to add up the $K^{th}$ pixel value and the $K^{th}$ summation value and thereby generate a $K^{th}$ output pixel value of the N output pixel value(s).

3. The super resolution image generating device of claim 2, wherein at least one of the front-end circuit, the first processing circuit, and the second processing circuit is configured to perform multiple convolution processes.

4. The super resolution image generating device of claim 2, wherein each of the front-end circuit, the first processing circuit, and the second processing circuit includes one of the following: a convolutional neural network (CNN); a residual network (Res-net); and a densely connected convolutional network (Dense-net).

5. The super resolution image generating device of claim 2, wherein each of the first scaling-up circuit and the second scaling-up circuit is a pixel shuffle circuit.

6. The super resolution image generating device of claim 2, wherein the N is greater than one, and the post-processing circuit includes:
a low-pass filter configured to generate N filtered values according to the N GAN variation values, wherein the N filtered values are corresponding to the N pixel values;
a controlled mask configured to determine M weights for M image blocks of the enlarged image, wherein the M is an integer greater than one, and the M image blocks are corresponding to M groups of pixel values of the N pixel values respectively, and the M image blocks are corresponding to M groups of filtered values of the N filtered values respectively; and
a multiplier coupled to the controlled mask and the low-pass filter, and configured to process the M groups of filtered values according to the M weights and thereby generate the N processed values.

7. The super resolution image generating device of claim 6, wherein the controlled mask determines the M weights according to external information including at least one of the following: semantic segmentation classification information; noise detection information; and motion strength information.

8. The super resolution image generating device of claim 6, wherein at least two of the M weights are different.

9. A super resolution image generating device, comprising:
an image scaling-up circuit configured to scale up a low resolution image and thereby generate an enlarged image, wherein the enlarged image includes N pixel value(s) and the N is a positive integer;
a first branch circuit configured to extract at least one feature of the low resolution image and thereby generate a first feature map, and configured to scale up the first feature map and thereby generate N first value(s), wherein the N first value(s) is/are corresponding to the N pixel value(s);
a second branch circuit configured to process the low resolution image and thereby generate a second feature map, and configured to scale up the second feature map and thereby generate N second value(s), and further configured to process the N second value(s) and thereby generate N processed value(s), wherein the second feature map includes image details and the N processed value(s) is/are corresponding to the N pixel value(s); and
an arithmetic circuit coupled to the image scaling-up circuit, the first branch circuit, and the second branch circuit, and configured to combine the N pixel value(s), the N first value(s), and the N processed value(s) and thereby generate N output pixel value(s) of a super resolution image.

10. The super resolution image generating device of claim 9, wherein:
the first branch circuit includes:
a first processing circuit configured to extract the at least one feature of the low resolution image and thereby generate the first feature map; and
a first scaling-up circuit configured to scale up the first feature map and thereby generate N stable variation value(s) as the N first value(s);
the second branch circuit includes:
a generative adversarial network (GAN) circuit including:
a second processing circuit configured to generate the second feature map according to the low resolution image; and
a second scaling-up circuit configured to scale up the second feature map and thereby generate N GAN variation value(s) as the N second value(s); and
a post-processing circuit configured to process the N GAN variation value(s) and thereby generate the N processed value(s); and
the arithmetic circuit includes:
a first summation circuit coupled to the first scaling-up circuit and the post-processing circuit, and configured to add up a $K^{th}$ variation value of the N stable variation value(s) and a $K^{th}$ processed value of the N processed value(s) and thereby generate a $K^{th}$ summation value corresponding to a $K^{th}$ pixel value of the N pixel value(s), wherein the K is a positive integer; and
a second summation circuit coupled to the image scaling-up circuit and the first summation circuit, and configured to add up the $K^{th}$ pixel value and the $K^{th}$ summation value and thereby generate a $K^{th}$ output pixel value of the N output pixel value(s).

11. The super resolution image generating device of claim 10, wherein at least one of the first processing circuit and the second processing circuit is configured to perform multiple convolution processes.

12. The super resolution image generating device of claim 10, wherein each of the first processing circuit and the second processing circuit includes one of the following: a convolutional neural network (CNN); a residual network (Res-net); and a densely connected convolutional network (Dense-net).

13. The super resolution image generating device of claim 10, wherein each of the first scaling-up circuit and the second scaling-up circuit is a pixel shuffle circuit.

14. The super resolution image generating device of claim 10, the N is greater than one, and the post-processing circuit includes:
a low-pass filter configured to generate N filtered values according to the N GAN variation values, wherein the N filtered values are corresponding to the N pixel values;
a controlled mask configured to determine M weights for M image blocks of the enlarged image, wherein the M is an integer greater than one, and the M image blocks are corresponding to M groups of pixel values of the N pixel values respectively, and the M image blocks are corresponding to M groups of filtered values of the N filtered values respectively; and
a multiplier coupled to the controlled mask and the low-pass filter, and configured to process the M groups of filtered values according to the M weights and thereby generate the N processed values.

15. The super resolution image generating device of claim 14, wherein the controlled mask determines the M weights according to external information including at least one of the following: semantic segmentation classification information; noise detection information; and motion strength information.

16. The super resolution image generating device of claim 14, wherein at least two of the M weights are different.

17. A super resolution image generating device, comprising:
a front-end circuit configured to reserve original pixel values of a low resolution image, and configured to extract at least one feature of the low resolution image and thereby generate a front-end feature map;
a first branch circuit configured to process the front-end feature map and thereby generate an enlarged image, wherein the enlarged image includes N stable pixel value(s) and the N is a positive integer;
a second branch circuit configured to process the front-end feature map and thereby generate a second feature map, and configured to scale up the second feature map and thereby generate N second value(s), and further configured to process the N second value(s) and thereby generate N processed value(s), wherein the second feature map includes image details and the N processed value(s) is/are corresponding to the N stable pixel value(s); and
an arithmetic circuit coupled to the first branch circuit and the second branch circuit, and configured to combine the N stable pixel value(s) and the N processed value(s) and thereby generate N output pixel value(s) of a super resolution image.

18. The super resolution image generating device of claim 17, wherein:
the first branch circuit includes:
a first processing circuit configured to reserve the original pixel values of the low resolution image, and configured to extract at least one feature of the front-end feature map and thereby generate a first feature map; and
a first scaling-up circuit configured to scale up the first feature map and thereby generate the enlarged image, wherein the enlarged image includes the N stable pixel value(s) composed of N stable value(s) and N first value(s), the N stable value(s) originate(s) from the original pixel values of the low resolution image, and the N first value(s) originate(s) from the at least one feature of the front-end feature map;
the second branch circuit includes:
a generative adversarial network (GAN) circuit including:
a second processing circuit configured to generate the second feature map according to the front-end feature map; and
a second scaling-up circuit configured to scale up the second feature map and thereby generate N GAN variation value(s) as the N second value(s); and
a post-processing circuit configured to process the N GAN variation value(s) and thereby generate the N processed value(s); and
the arithmetic circuit is configured to add up a $K^{th}$ stable pixel value of the N stable pixel value(s) and a $K^{th}$ processed value of the N processed value(s) and thereby generate a $K^{th}$ output pixel value of the N output pixel value(s), wherein the K is a positive integer.

19. The super resolution image generating device of claim 18, wherein each of the front-end circuit, the first processing circuit, and the second processing circuit includes one of the following: a convolutional neural network (CNN); a residual network (Res-net); and a densely connected convolutional network (Dense-net).

20. The super resolution image generating device of claim 18, wherein the N is greater than one, and the post-processing circuit includes:
a low-pass filter configured to generate N filtered values according to the N GAN variation values, wherein the N filtered values are corresponding to the N stable pixel values;
a controlled mask configured to determine M weights for M image blocks of the enlarged image, wherein the M is an integer greater than one, and the M image blocks are corresponding to M groups of pixel values of the N stable pixel values respectively, and the M image blocks are corresponding to M groups of filtered values of the N filtered values respectively; and
a multiplier coupled to the controlled mask and the low-pass filter, and configured to process the M groups of filtered values according to the M weights and thereby generate the N processed values.

\* \* \* \* \*